(12) United States Patent
Matsumoto et al.

(10) Patent No.: US 7,054,070 B2
(45) Date of Patent: May 30, 2006

(54) GRADIENT-INDEX LENS AND COMPOSITE OPTICAL ELEMENT UTILIZING THE SAME

(75) Inventors: Mitsuaki Matsumoto, Osaka (JP); Keiichi Kuramoto, Kadoma (JP); Youhei Nakagawa, Hirakata (JP); Hiroaki Izu, Hirakata (JP); Hitoshi Hirano, Nishomiya (JP); Nobuhiko Hayashi, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 16 days.

(21) Appl. No.: 10/849,553

(22) Filed: May 20, 2004

(65) Prior Publication Data

US 2005/0007675 A1   Jan. 13, 2005

(30) Foreign Application Priority Data

May 23, 2003  (JP)  .............................. 2003-145795
May 13, 2004  (JP)  .............................. 2004-144184

(51) Int. Cl.
*G02B 9/00*   (2006.01)
*G02B 6/028*  (2006.01)

(52) U.S. Cl. ...................................... 359/652; 385/124

(58) Field of Classification Search ........ 359/652–654; 385/124
See application file for complete search history.

(56) References Cited

U.S. PATENT DOCUMENTS

| | | | | |
|---|---|---|---|---|
| 4,265,515 A | * | 5/1981 | Kao ............................ 385/127 |
| 4,657,344 A |   | 4/1987 | Bohm ......................... 477/166 |
| 4,900,138 A | * | 2/1990 | Atkinson et al. ............ 359/654 |
| 4,929,065 A | * | 5/1990 | Hagerty et al. ............. 359/653 |
| 5,200,858 A | * | 4/1993 | Hagerty et al. ............. 359/652 |
| 5,504,623 A | * | 4/1996 | Xu ............................. 359/653 |
| 6,695,880 B1 | * | 2/2004 | Roffman et al. ........... 623/6.28 |

FOREIGN PATENT DOCUMENTS

| | | |
|---|---|---|
| JP | 60-84501 | 5/1985 |
| JP | 63-273801 | 11/1988 |

\* cited by examiner

*Primary Examiner*—Ricky Mack
*Assistant Examiner*—William Choi
(74) *Attorney, Agent, or Firm*—McDermott Will & Emery LLP

(57) ABSTRACT

A gradient-index lens is structured by a multilayer film that includes therein a plurality of layers each of which has different refractive index and layer thickness from the other.

20 Claims, 21 Drawing Sheets

RELATED ART $$n(x) = 1.510 \left(1 - \frac{0.617}{2} x^2\right) \quad \text{EQUATION 1}$$

RELATED ART

RELATED ART $$n(x) = 1.510 \left(1 - \frac{0.617}{2} x^2 \right) \quad \text{EQUATION 1}$$

SURFACE 1        SURFACE 2

A: $n(x) = 1.510 \left(1 - \dfrac{0.617}{2} x^2\right)$   EQUATION 2-1

B: $n(x) = 1.510 \left(1 - \dfrac{0.510}{2} x^2\right)$   EQUATION 2-2

A: $n(x) = 1.464 \left(1 - \dfrac{0.617}{2} x^2\right)$ EQUATION 3-1

B: $n(x) = 1.464 \left(1 - \dfrac{0.510}{2} x^2\right)$ EQUATION 3-2

SURFACE 1

SURFACE 2
(EQUATION 4-3)

$y=1.14x^2$
EQUATION 4-3

A: $n(x) = 3.143 \left(1 - \dfrac{0.617}{2} x^2\right)$  EQUATION 4-1

B: $n(x) = 3.143 \left(1 - \dfrac{0.510}{2} x^2\right)$  EQUATION 4-2

TOP VIEW

130

SIDE VIEW

134

GRADIENT-INDEX LENS AND COMPOSITE OPTICAL ELEMENT UTILIZING THE SAME

The priority Japanese Patent Application Number 2003-145795 upon which this patent application is based is hereby incorporated by reference.

BACKGROUND OF THE INVENTION

1. Field of the Invention

The present invention relates to gradient-index (GRIN) lenses and composite optical elements, optical circuits, optical integrated circuits and so forth utilizing the GRIN lenses.

2. Description of the Related Art

The conventional lenses are generally convex lenses which have spherical or other curved surfaces. In contrast to them, gradient-index lenses, as illustrated in FIG. 1, are made of glass or polymeric material provided with a refractive index profile. They are being manufactured and sold with a brand name of "SELFOC lens" for instance. The lenses of this type are characterized not only by their capacity for miniaturization but also by their easy incorporation into collimating optical systems or confocal optical systems because, for example, of their capacity for focusing on the end surface of the lens. For these advantages, gradient-index lenses are being widely used in the optical information processing area, including optical systems of optical fiber communication or scanners.

As an example of such gradient-index lenses, Japanese Paten Application Laid-Open No. Sho63-273801 discloses one which comprises multiple layers with different refractive indices. With this lens, a desired refractive index profile is obtained by laminating the crystals of ZnSSe or the like by appropriately changing the composition ratios by an MBE (Molecular Beam Epitaxy) or similar method. However, the lens as disclosed in this reference poses a problem of increased errors in the peripheral, or edge, parts of the lens, which are subject to greater variation in refractive index when the layers are each about 10 μm thick. This, in turn, leads to a problem of multiple points of focus due to the occurrence of sub-spots. Although it is not yet fully clarified, the cause of the occurrence of sub-spots is assumed to be as follows. In the middle part of the lens, the changes in refractive index are relatively small, and the physical distances over which light passes are short. In the peripheral parts of the lens, however, the changes in refractive index are large, and the physical distances over which light passes are long. As a result, step approximation of the refractive index profile in the edges of the lens produces greater effect on focusing of light, thus creating an actual focal length different from design. In this manner, light beams passing through the peripheral parts of the lens are assumed to converge on sub-spots.

On the other hand, the lens disclosed in Japanese Paten Application Laid-Open No. Sho60-84501 achieves an improved focusing of light by employing such design that the layer thickness is made thinner in the periphery of the lens to create a Fresnel profile. Yet the method proposed in this reference requires a design of the refractive index profile of the lens to form a diffraction grating, which places restrictions on the optical characteristics of an optical element, such as its dimensions, focal length and wavelengths to be used. Moreover, it is difficult to manufacture the lens of this type since the layer thickness must be controlled over the wide range thereof.

Related Art List (1) Japanese Patent Application Laid-Open No. Sho63-273801.
(2) Japanese Patent Application Laid-Open No. Sho60-84501.

SUMMARY OF THE INVENTION

The present invention has been made in view of the foregoing circumstances and an object thereof is to provide a gradient-index lens which offers an improved focusing of light while preventing the occurrence of multiple points of focus.

A gradient-index lens according to the present invention is one including multilayered film having a refractive index profile in a stacking direction, and the this lens includes: a first area constituted by two or more continuous layers whose thickness are approximately equal to one another and where the multilayered film of at least one side thereof with respect to an optical axis has a different refractive index; and a second area, thicker than the first area, which is constituted by two or more continuous layers whose thickness are approximately equal to one another and whose refractive indices differ from one another.

According to the present invention, the thickness of layers in the multilayered film, comprised of a plurality of layers whose refractive indices differ from one another, is non-uniform. Therefore, either the following (1) or (2) may be realized:

(1) Design is changed in the middle part of lens and the peripheral part thereof so that their focal lengths are the same.
(2) The depth of focus is extended by intentionally slackening the convergence of light in the middle or peripheral part. Thereby, the focal lengths are made to be equal in both the middle part and peripheral part of a lens. Hence, the occurrence of sub-spots can be prevented.

A variety of modes for carrying out the invention may be adopted for the multilayered film containing layers whose thickness differs from one another. In only part of the multilayered films there may be placed a layer whose thickness differs from the other layers. A structure may be such that the thickness of layer is larger in the peripheral part away from the center section than in the center section of the multilayered film. A profile or distribution of layer thickness may be asymmetrical about an optical axis reference. The multilayered film may be provided only at one side with respect to the optical axis or may be provided at both sides of the optical axis. Moreover, the optical axis may be deviated from the center of lens in the stacking direction. Such designing of the thickness will be described later through examples in DETAILED DESCRIPTION OF THE INVENTION.

In a gradient-index lens according to the present invention, a structure may be such that part or whole of a side that intersects with an optical axis of the gradient-index lens is of a convex shape having a curvature in a horizontal plane perpendicular to the stacking direction. By implementing such a structure, obtained is a gradient-index lens having the focusing even in the horizontal plane, so that the focusing characteristic of a lens as a whole is further improved. In this case, it is preferable that the focal length in a plane parallel to the stacking direction and the optical axis is approximately identical to the focal length in the horizontal plane. As a result, the focusing characteristic is further improved and the astigmatism can be reduced significantly.

In a gradient-index lens according to the present invention, the focal length or the depth of focus of each layer constituting the multilayered film is adjusted according to the material or thickness of the layer, and a structure may be such that the focal points of a gradient-index lens as a whole are nearly identical. As a result, the suppression of the multiple focuses and the improvement in the focusing can be stably realized to the greater extent.

A various modes for carrying out the present invention may be adopted in forming a refractive index profile along the stacking direction of the multilayered film in a cross section of the multilayered film perpendicular to the optical axis. For instance, the refractive index profile may be structured in a manner such that a refractive index decreases as the cross section moves away from a center of the cross section along the stacking direction of the multilayered film.

Then the lens may be structured such that the refractive index profile is distributed by step approximation of aspheric surface expressed by the following Equation (1). If the profile is represented by a hyperbolic function or quadratic function, in particular, among functions expressed in the Equation (1), the excellent focusing characteristic can be stably realized.

$$z = \frac{ch^2}{1+\sqrt{1-(K+1)c^2h^2}} + A \cdot h^4 + B \cdot h^6 + C \cdot h^8 +$$
$$D \cdot h^{10} + E \cdot h^{12} + F \cdot h^{14} + G \cdot h^{16} + H \cdot h^{18} + \ldots$$

Equation (1)

where c is a vertex curvature ($mm^{-1}$), namely, a reciprocal of radius of curvature (mm), K is a conic constant, A,B,C, D,E,F,G, H . . . are aspheric coefficients, and $h^2=x^2+y^2$ (mm) with x and y being coordinates on the surface.

In a lens, obtained by step approximation of a plurality of quadratic functions, whose refractive indices differ between the middle and the peripheral part of an optical element, the focusing can be improved if the focal points at the middle and the peripheral part can be made identical. The step approximation may be carried out on a plurality of different quadratic functions by making the thickness of layers in the peripheral part smaller than that in the middle part of the optical element.

In a gradient-index lens according to the present invention, the multilayered film may be formed of an organic-inorganic composite containing at least one type of metal alkoxide. With this structure, the multilayered films containing a plurality of layers whose refractive indices and thickness differ from one another can be stably formed by a simple process. For example, a plurality of solutions containing the above materials in different composition ratios are prepared and these are sequentially poured into a mold and hardened so as to form multilayered films on a substrate. If the adjustment is made by mixing these solutions of two or more types, changing the mixing ratio makes it possible to form a desired refractive index profile with superb controllability.

The multilayered film according to the present invention may be formed on a substrate or may be formed without a substrate. If it is to be formed without a substrate, a process therefor may be, for example, such that, after the multilayered film is stacked on the substrate, the substrate is removed.

The gradient-index lens according to the present invention may be applied to and utilized in various fields. For example, the gradient-index lens may be combined with other optical elements so as to provide a composite element. As an example of such a composite optical, the gradient-index lens according to the present invention may be integrally structured with any of a light emitting element, a light receiving element and a fiber. Moreover, a structure may be such that the gradient-index lens has a side surface which intersects with the optical axis in a tilted manner and at least one of a total reflection mirror, a partial transmission mirror and a wavelength selector is provided on the side surface. With this structure, a composite optical element, of compact size, which excels in the optical characteristics can be realized.

Furthermore, according to the present invention, there is provided an optical circuit in which the above gradient-index lens is combined with other optical elements, optical functional elements and the like. There is also provided an optical integrated circuit in which this optical circuit is fabricated on a single substrate. In this optical integrated circuit, part or whole of the optical circuit may be integrally formed with the above gradient-index lens.

Furthermore, according to the present invention, there are provided an optical recording apparatus, an optical reproducing apparatus and an optical pickup system equipped with such an optical circuit or the above gradient-index lens. There is further provided an optical transceiver module, which contains at least one of a light emitting element and a light receiving element, equipped with an optical fiber or a connector connecting the optical fibers and the above gradient-index lens or the above optical circuit. In the optical circuit and the optical integrated circuit, any of part or whole of the substrate and part or whole of the optical circuit may be formed by the same material as that of the above gradient-index lens. With this structure, an optical integrated circuit substrate, on which an optical integrated circuit having a plurality of the above gradient-index lenses combined therein, guide grooves, markers, terraces and the like are integrally structured, is positioned with precision and can be formed together.

It is to be noted that any arbitrary combination of the above-described structural components, and expressions changed between a method and an apparatus are all effective as and encompassed by the present embodiments.

Moreover, this summary of the invention does not necessarily describe all necessary features so that the invention may also be sub-combination of these described features.

DETAILED DESCRIPTION OF THE INVENTION

Figure 1:
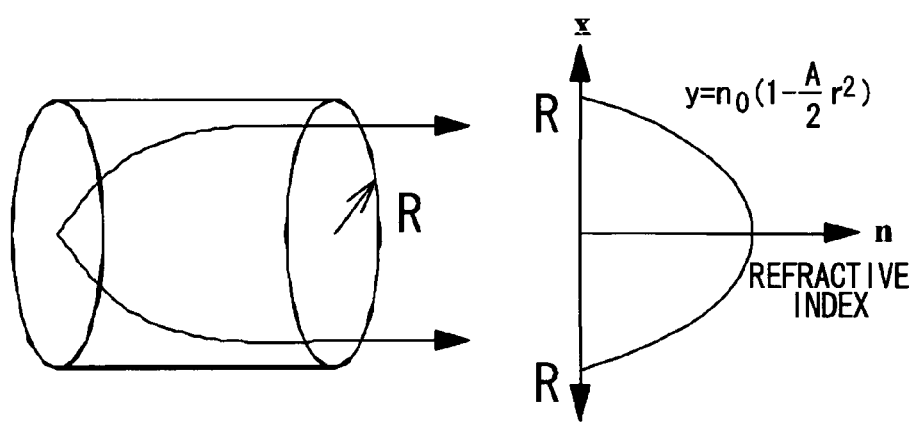
FIG. 1 shows a structure of a conventional gradient-index lens.

The invention will now be described based on preferred embodiments which do not intend to limit the scope of the present invention but exemplify the invention. All of the features and the combinations thereof described in the embodiment are not necessarily essential to the invention.

The present invention, in which a stack of relatively thick layers is assumed for easier manufacturing, proposes the following structures for a gradient-index lens to solve the problem of multiple focuses or superimposed focal points, which may otherwise result from a stack of such layers.

In a first structure, the thickness of some of the layers of a multilayered film constituting a gradient-index lens is changed intentionally to slacken the convergence of light, thereby extending the depth of focus, so that the focus meets the one created by light converged from the other parts of the lens.

In a second structure, focal dislocation in the peripheral area of the lens is corrected by providing a refractive index profile through step approximation of quadratic functions which differ between the middle and the peripheral part of an optical element.

The optical element according to the present invention has a layered structure nearly uniform in the horizontal direction, so that a refractive index profile in the thickness direction may be easily produced by stacking layers on a flat substrate. Then an arbitrary planar form including a curved side surface for the focusing of light may be produced by a machining, pressing or etching process. Accordingly, it is easy to form an optical circuit integrally with a plurality of optical elements according to the present invention or to form an optical element according to the present invention which is added with functions other than the convergence of light. Moreover, an optical element according to the present invention may be produced at low cost because the production thereof does not require large-scale equipment, such as a spinning machine, or expensive materials, such as precision glass rods of exact roundness containing special impurities.

Now a description will be given of the materials that can be used for a multilayered film according to the present invention. The multilayered film may be formed of an organic material, a semiconductor material or an organic-inorganic composite material.

The organic-inorganic composite material contains at least one type of metal alkoxide. The organic-inorganic composite material may further contain an organic polymer.

The metal alkoxide usable in this invention is generally what is expressed by $M(OR)_n$ (M: a metal, R: an alkyl group, n: 2, 3, 4 or 5), $R'M(OR)_{n-1}$ (M: a metal, R: an alkyl group, R': an organic group, n: 2, 3, 4 or 5), or $R'_2M(OR)_{n-2}$ (M: a metal, R: an alkyl group, R': an organic group, n: 2, 3, 4 or 5). The metal alkoxide may also contain organoalkoxysilane and what is called a silane coupling agent.

Si, Ti, Zr, Al, Sn, Zn or the like are preferably used as the metal (M). For example, when the metal (M) is a tetravalent metal, a metal alkoxide expressed as $M(OR)_4$, $R'M(OR)_3$ or $R'_2M(OR)_2$ may be used.

An alkyl group whose carbon number is 1 to 5 may be used as the alkyl group (R).

The organic group (R') usable herein is, for instance, an alkyl group, an aryl-containing group, an acryloxy-containing group, an methacryloxy-containing group, a styryl-containing group, an epoxy-containing group or the like.

The metal alkoxide to be used preferably is alkoxysilane, titanium alkoxide or zirconium, of which alkoxysilane is used most preferably.

The alkoxysilane usable herein includes tetraethoxysilane, tetramethoxysilane, tetra-n-propoxysilane, tetraisopropoxysilane, tetra-n-butoxysilane, tetraisobutoxysilane, phenyltriethoxysilane, phenyltrimethoxysilane, diphenyldiethoxysilane, diphenyldimethoxysilane, 3-methacryloxypropyltriethoxysilane, 3-methacryloxypropyltrimethoxysilane, 3-methacryloxypropylmethyldimethoxysilane, 3-acryloxypropyltrimethoxysilane, or the like.

The titanium alkoxide usable may be titanium isopropoxide, titanium butoxide or the like. The zirconium alkoxide usable may be zirconium isopropoxide, zirconium butoxide or the like.

As the organic polymer, any organic polymer can be used so long as it, together with a metal alkoxide, can form an organic-inorganic composite material. Such an organic polymer, for instance, may be a high polymer having a carbonyl group, a high polymer having a benzene ring or a high polymer having a naphthalene ring. Concrete examples of the organic polymer may include polyvinyl pyrrolidone, polycarbonate, polymethylmethacrylate, polyamide, polyimide, polystyrene, polyethylene, polypropylene, epoxy resin, phenol resin, acrylic resin, urea resin and melamine resin. In order to form an organic-inorganic composite material which excels in optical transparency, however, polyvinyl pyrrolidone, polycarbonate, polymethylmethacrylate, polystyrene or their mixture is preferably used as the organic polymer.

In addition, a hydrolytic polycondensate of 3-methacryloxypropyltriethoxysilane, a hydrolytic polycondensate of 3-methacryloxypropyltrimethoxysilane, a hydrolytic polycondensate of p-styryltriethoxysilane, or a hydrolytic polycondensate of p-styryltrimethoxysilane is also preferably used as the organic polymer. When the above-mentioned organic-inorganic composite material is to be prepared by the sol-gel method using an organic polymer as cited above, alcohol, such as methanol, ethanol, isopropanol or butanol, may be used as the solvent.

On the other hand, when a resin, such as polymethylmethacrylate, polystyrene or polyvinyl naphthalene, is used as the organic polymer, a solvent, such as N-methyl-2-pyrroridone or dimethylformamide, may be used.

Further, the multiplayer films may be formed of any of a variety of UV-cured resins. Such a UV-cured resin to be used here is, for instance, an epoxy UV-cured resin whose principal component is epoxy resin, an acrylic UV-cured resin, an epoxy acrylate UV-cured resin or a polyurethane UV-cured resin.

A multilayered film according to the present invention may be formed of a semiconductor material. For example, GaAs/GaAlAs type, InP/InGaAsP type or GaN/InGaN type III–V group materials or the ZnSe/ZnS type II–VI group materials are usable, of which the GaN/InGaN type and the ZnSe/ZnS type in particular can be used in a visible wavelength range.

The layers to be structured by these materials can be formed by the MOCVD (Metal-organic Chemical Vapor Depostion), the MBE (Molecular Beam Epitaxy), the ALD (Atomic Layer Deposition) or the like process.

A gradient-index lens according to the present invention may be applied to and used for electrical wiring boards, optical communication devices, which include optical transceiver modules, optical switches, variable optical attenuators, optical circulators, optical isolators, optical modulators, optical amplifiers, optical beam splitters, optical couplers, wavelength splitters, interleavers, dispersion compensators, optical combiners and optical multi/demultiplexers, optical functional parts, which include photocouplers, photo-interrupters, photoreflectors, infrared remote-control transceiver modules, lens-attached semiconductor laser modules and lens-attached photodiode modules, and optical apparatuses, which include cameras, scanners and optical pickups.

Hereinbelow, a thin-film lens, which is a multilayered film formed on a substrate, and an element using it will be described referring to drawings.

First Embodiment

Figure 4A:
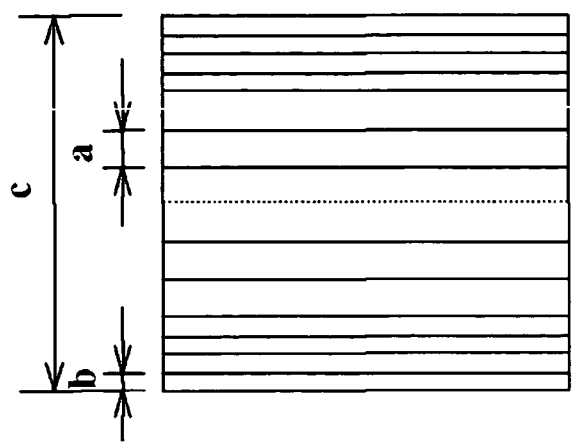
FIGS. 4A and 4B show a structure of a gradient-index lens according to a first embodiment.
Figure 4B:
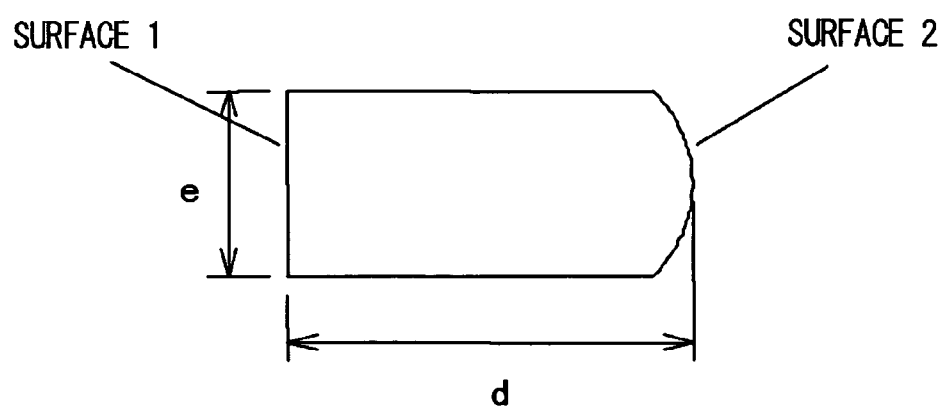
Figure 5:
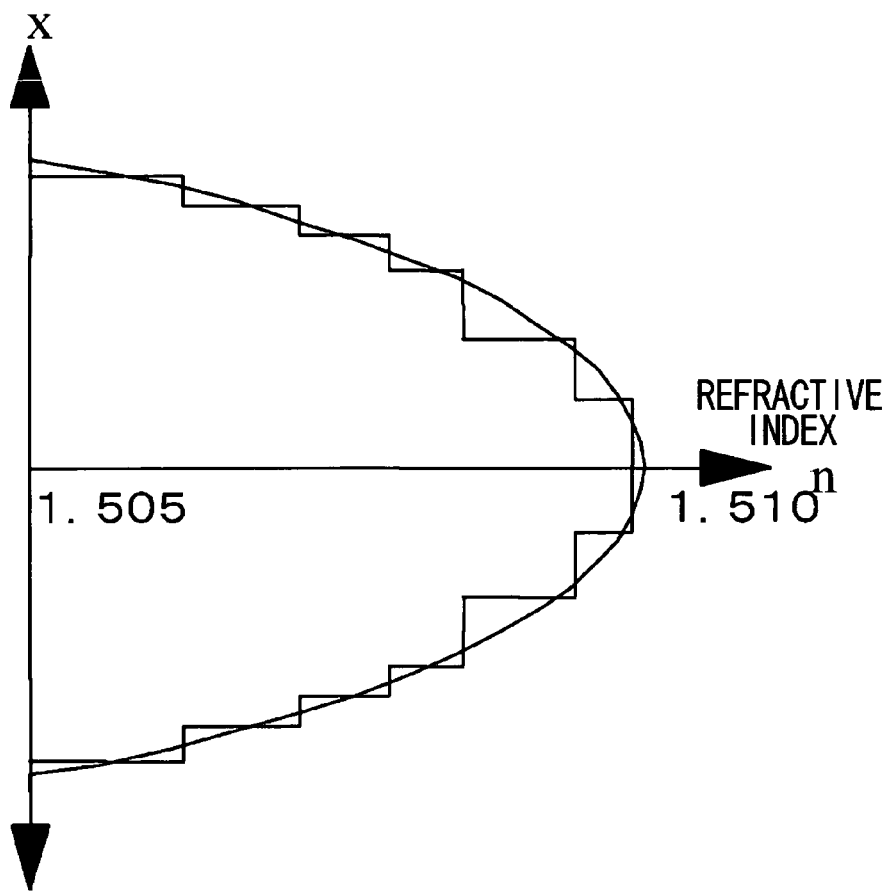
FIG. 5 shows a refractive index profile of a gradient-index lens according to the first embodiment.

FIGS. 4A and 4B illustrate the shape and dimensions of an optical element according to a first embodiment. FIG. 5 shows a refractive index profile thereof. The refractive index is so designed as to present a profile obtained by a step approximation of Equation 1.

This optical element is produced using an organic-inorganic composite material that is synthesized through the following process.

(1) Production of a Hydrolytic Polycondensate Solution of a Metal Alkoxide

<Solution A>

Solution A is produced by mixing:
3-methacryloxypropyltriethoxysilane (hereinafter referred to as MPTES): 13.2 grams;
Ethanol: 14.2 grams; and
Hydrochloric acid (2N): 1.35 grams
and then, after leaving the mixture standing at 30° C. for 45 hours, heating it in a heating furnace at 90° C. for 40 minutes to remove the ethanol (solvent).

<Solution B>

Solution B is produced by mixing:
Phenyltrimethoxysilane (hereinafter referred to as PhTMS): 13.2 grams;
Ethanol: 14.2 grams; and
Hydrochloric acid (2N): 1.35 grams
and then, after leaving the mixture standing at 30° C. for 45 hours, heating it in a heating furnace at 90° C. for 40 minutes to remove the ethanol (solvent).

Now solution A and solution B are mixed to bond the OH group in the hydrolyte of MPTES and the OH group in the hydrolyte of PhTES through polycondensation (the material remaining a solution at this stage). Then the mixed solution is solidified as it is subjected to irradiation and heating, which polymerizes the methacryloxy group in MPTES. The refractive index of the thus obtained solid is controllable by the mixing ratio of solution A and solution B within a range from approximately 1.49 (when solution A is 100 wt %) to approximately 1.54 (when solution A is 23.5 wt %).

(2) Production of an Optical Element (i) A pattern or mold made of an elastic material is placed on a glass plate. The elastic material may be any of polysiloxane materials. One example of such a material is silicone rubber, which improves the detachability of the mold.

(ii) Solution A is introduced into the above-mentioned mold (so that the liquid surface is about 0.5 mm from the glass substrate), and then the solution A is irradiated with ultraviolet rays from an ultraviolet lamp (150 W) for a certain period of time from below the glass substrate to harden the area of approximately 10 μm from the glass substrate (first area). The refractive index of the first area was approximately 1.505.

(iii) Then solution B is added to the part of solution A, in the mold, which is not hardened yet, and after sufficient agitation, the mixture is irradiated with ultraviolet rays the same way as in (ii) above so as to form a second area with a thickness of 10 μm over the first area. The refractive index of the second area was 1.506.

(iv) The stacking is continued with the layer thickness of 20 μm employed for a fifth area and ones thereafter. The middle seventh and eighth areas, whose refractive index was 1.510, had a total layer thickness of 40 μm. From the eleventh area onward, the layer thickness was 10 μm and the same process as in (iii) was repeated.

After the lamination, the mold was removed, thus producing a gradient-index lens of a structure as illustrated in FIGS. 4A and 4B. In the present embodiment, the values for a to e in FIGS. 4A and 4B, which can be changed as appropriate, were selected as follows.

a=20 μm
b=10 μm
c=200 μm
d=2 mm
e=1 mm where a represents the thickness of each of the fifth to the tenth layer and b represents the thickness of each of the first to the fourth layer and the eleventh to the fourteenth layer. The first layer here is the layer at the bottom of the stack in FIG. 4A, and the layers are the second, the third, ... and so on as they go up.

The curvature of surface 2 in the top view is 0.675. And this gradient-index lens has a refractive index profile in the layer thickness direction as illustrated in FIG. 5.

COMPARATIVE EXAMPLE 1

Figure 2:
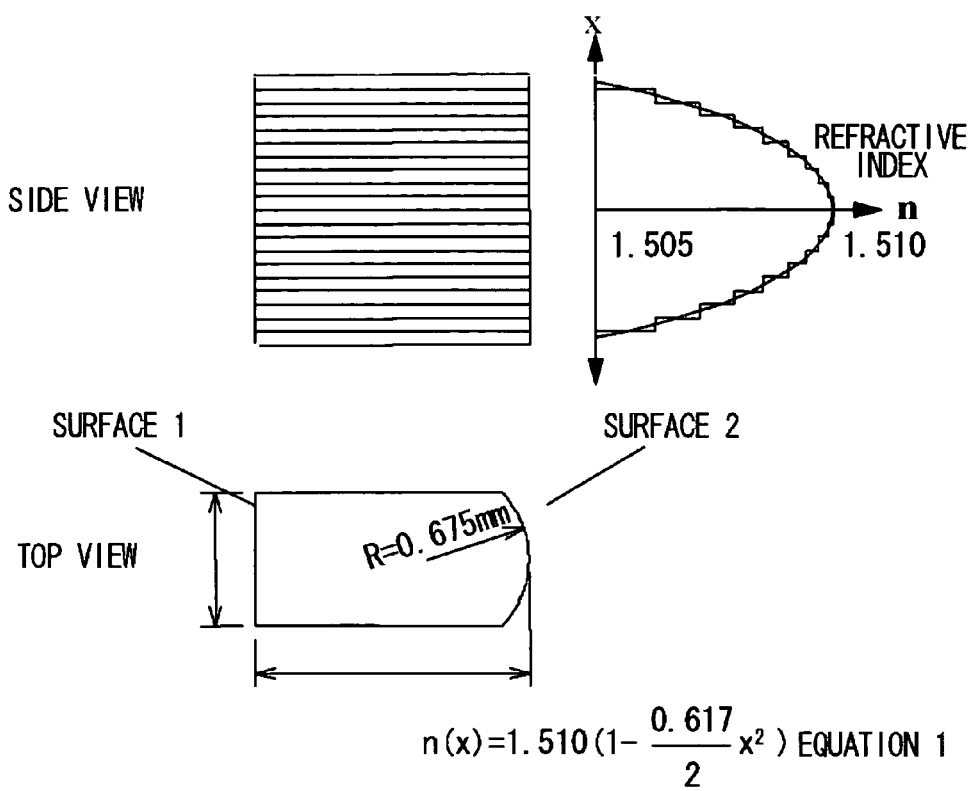
FIG. 2 shows refractive index profiles of a conventional gradient-index lens.

In this comparative example 1, the thickness of each layer that forms a multilayered film on a substrate was a constant 10 μm. Other than this, a gradient-index lens was produced the same way as in the first embodiment. The lens produced thus has a structure shown in FIG. 2. An approximate function for refractive index profile is expressed by the same equation (Equation 1 shown in FIG. 2) as in the first embodiment.

The collimating light (parallel light) irradiated from the HeNe laser was entered through the surface 2 of the gradient-index lenses prepared in the first embodiment and the comparative example 1. As a result, the light was gradually bent according to the refractive index profile in the thickness direction of the gradient-index lens and was bent in the horizontal direction due to a cylindrical shape of surface 2, and was finally focused on the surface 1.

Figure 3:
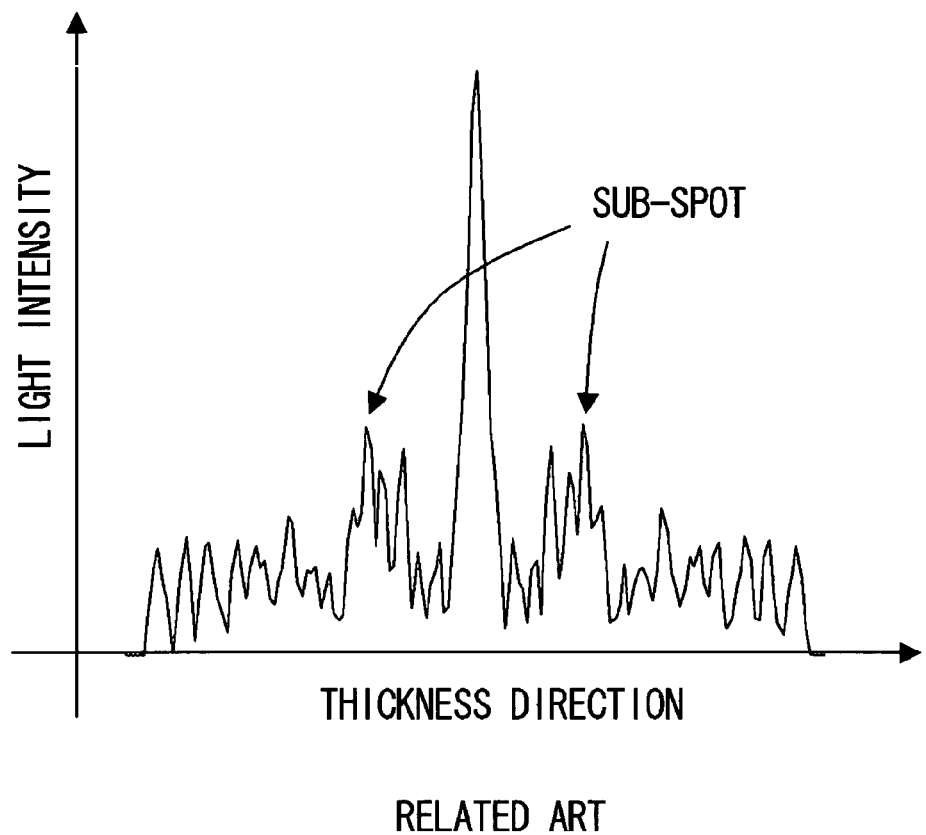
FIG. 3 shows a result where the light intensity of a conventional gradient-index lens in the thickness direction is measured.
Figure 6:
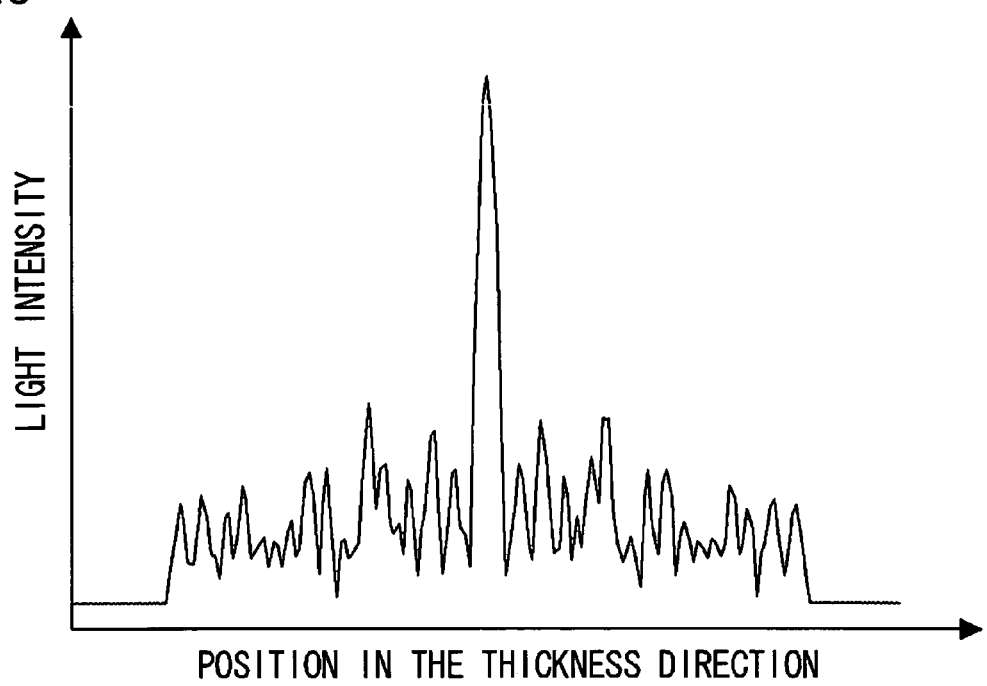
FIG. 6 shows a result where the light intensity of a gradient-index lens, according to the first embodiment, in the thickness direction is measured.

The light intensity distribution of focusing spots on the surface 1 in thickness direction of the gradient-index lens was measured. The result of measured light intensity distribution for the first embodiment was shown in FIG. 6 whereas the result thereof for the comparative example 1 was shown in FIG. 3. It was confirmed in the comparative example 1 that there are multiple focal points. This is because the error becomes large in a peripheral part where there is a large variation in the refractive indices, so that sub-spots are caused there. In contrast thereto, no sub-spot was observed in the first embodiment and a satisfactory light intensity profile was obtained. The full width at half maximum (FWHM) of a spot was about 7 μm in the first embodiment whereas it was about 6 μm in the comparative example 1. Thus, the focusing characteristic was improved in the first embodiment compared to the comparative example 1. Moreover, in the first embodiment each surface was so produced that it was perpendicular to the lower surface. Thus, the optical axis is rectilinear without being bent by the gradient-index lens.

MPTES was used as material for multilayered films in the first embodiment. However, it was also verified that the same result was obtained when 3-methacryloxypropyltrimethoxysilane (MPTMS) was used in place of MPTEMS or when Phenyltriethoxysilane (PhTES) was used in place of PhTMS. The surface 2 was cylindrical because the production thereof is easy. However, the astigmatism in a paraxial area becomes zero in theory by processing this cylindrical surface to be of a quadratic function shape. Moreover, a resin adjusted to have a desired refractive index may be stacked in the similar manner, instead of using the organic-inorganic composite in this first embodiment. As a result, the similar structure can be obtained even with the polymer.

The thickness of thin layers for areas 1 to 4 and 11 to 14 was 10 μm. It was confirmed through experiments that the phenomenon of the above-mentioned multiple focal points is not noticeable when this layer thickness was twice the wavelength or below and that the focusing capability itself significantly degrades when this layer thickness is thirty times as thick as the wavelength or above. Thus, if the thickness of thin layers is in the rage of twice to thirty times the wavelength, the correction by which part of layer thickness is changed according to the present invention is effective.

Second Embodiment

Figure 7A:
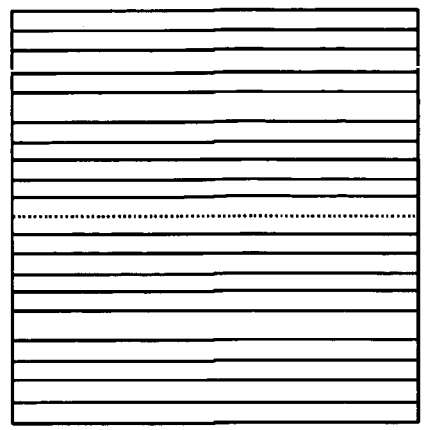
FIGS. 7A and 7B show a structure of a gradient-index lens according to a second embodiment.
Figure 7B:
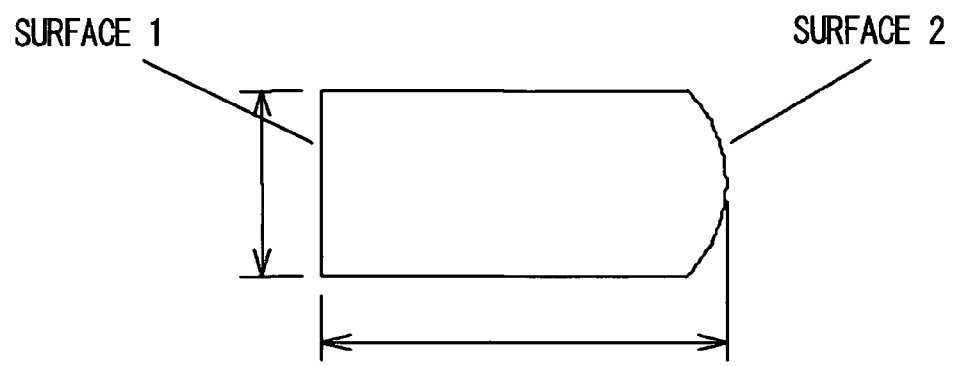
Figure 8:
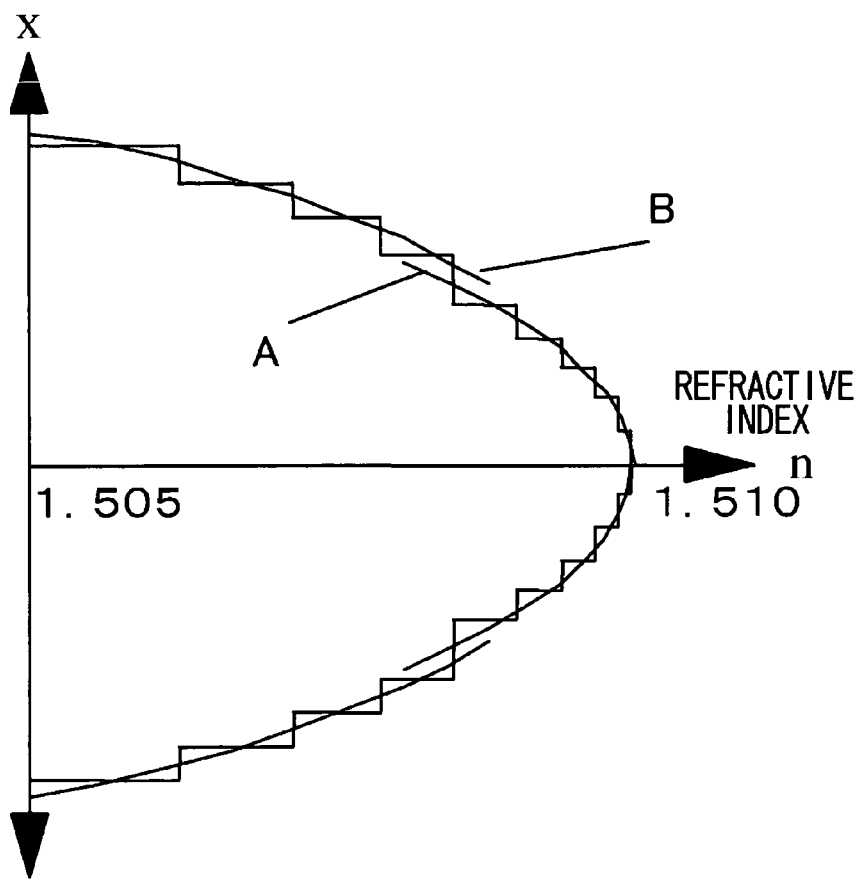
FIG. 8 shows a refractive index profile of a gradient-index lens according to the second embodiment.

FIGS. 7A and 7B illustrate the shape and dimensions of a gradient-index lens according to a second embodiment. FIG. 8 shows a refractive index profile thereof. The refractive indices are so designed as to present a profile obtained by a step approximation of Equation 2-1 in the middle part of the lens and a profile obtained thereby of Equation 2-2 in the peripheral part of the lens.

In the second embodiment, the same material used as in the first embodiment was used and the thickness of each layer was as follows.

From the first layer through the fourth layer as well as from the seventeenth layer through the twentieth layer: 11 μm.

The fifth layer and the sixteenth layer: 10 μm.

The sixth layer and the fifteenth layer: 16 μm.

Figure 9:
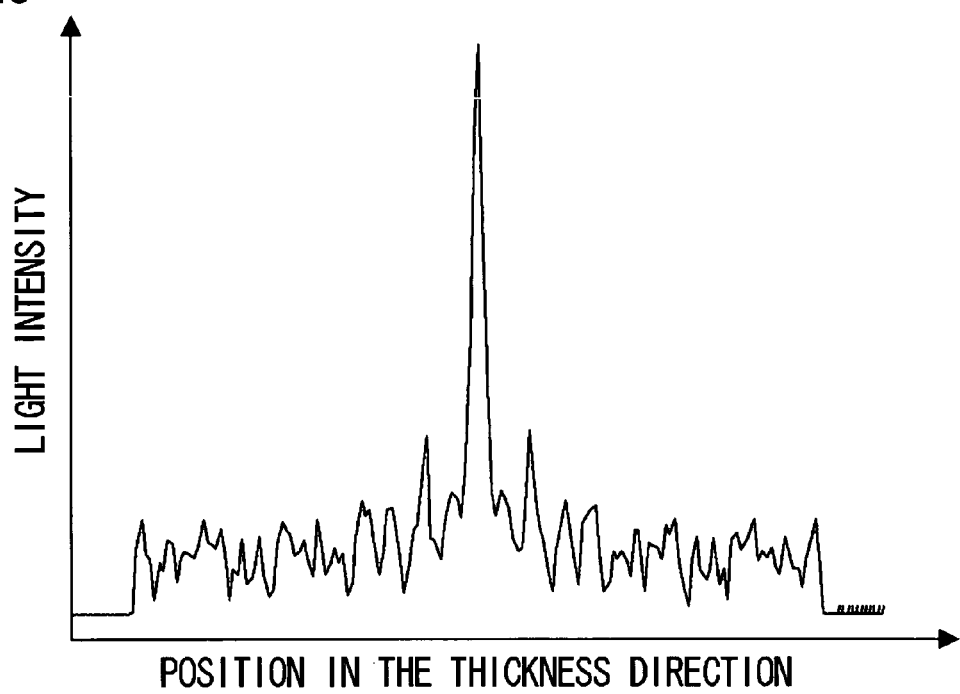
FIG. 9 shows a result where the light intensity of a gradient-index lens, according to the second embodiment, in the thickness direction is measured.

When the HeNe laser was irradiated, in a manner similar to the first embodiment, to the gradient-index lens thus prepared in the second embodiment, the light beams were focused on the surface 1, too. FIG. 9 shows the light intensity distribution of focusing spots in thickness direction according to the second embodiment. The full width at half maximum (FWHM) of a spot was about 5 μm in the second embodiment. Thus, the focusing characteristic was further improved over the first embodiment.

Even in this method according to the second embodiment where a refractive index profile is obtained by step approximation of quadratic functions which differ between the middle and the peripheral part of the lens is adopted, correcting the dislocation of focus serves effective if the thickness of thin layers is, in the same manner as the first embodiment, in the range of approximately twice to thirty times the wavelength to be used.

According to the second embodiment, the refractive index profile is such that the step approximation was performed on the quadratic functions which differ between the middle and peripheral part of the lens. Thus, the dislocation of focus in the peripheral part is corrected and the gradient-index lens with superior performance and capability is provided.

Third Embodiment

Figure 10A:
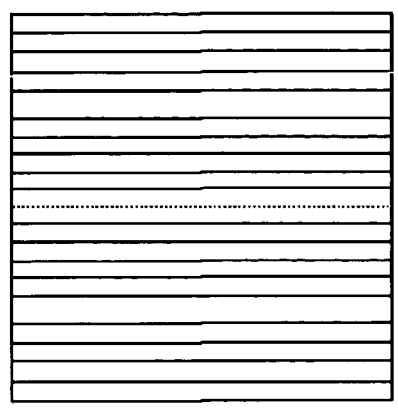
FIGS. 10A and 10B show a structure of a gradient-index lens according to a third embodiment.
Figure 10B:
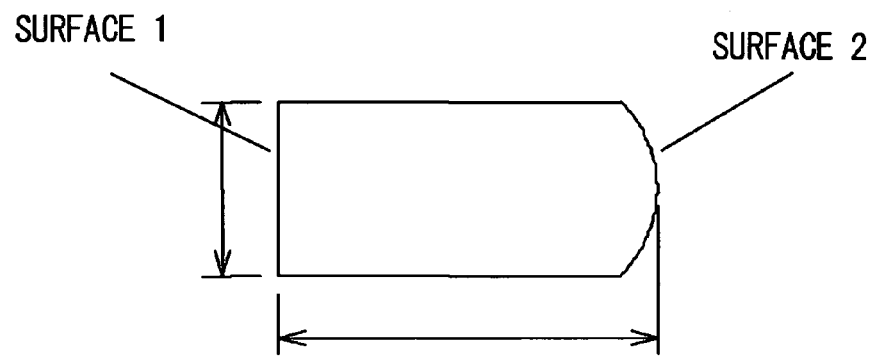
Figure 11:
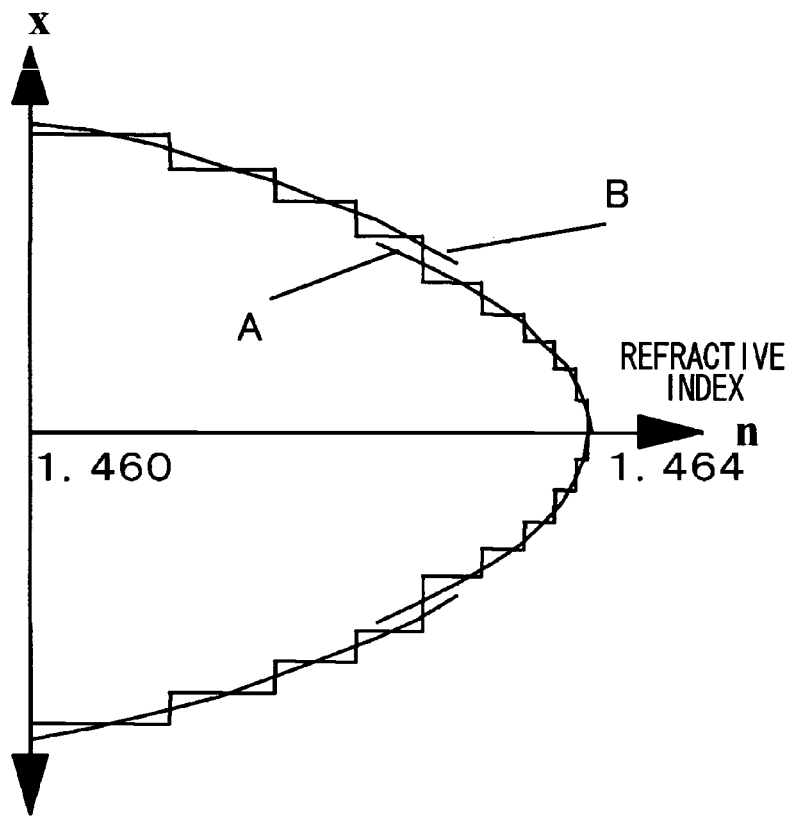
FIG. 11 shows a refractive index profile of a gradient-index lens according to the third embodiment.

FIGS. 10A and 10B illustrate a shape of gradient-index lens according to a third embodiment. Referring to FIG. 10B showing a top view of the gradient-index lens, the curvature of surface 2 is 0.697 and the outside dimensions are the same as those in the first embodiment above, namely, the horizontal length is 2 mm and the vertical length is 1 mm. FIG. 11 illustrates a refractive index profile. In the case of FIG. 11, an element is so designed that the refractive index in the middle part of the element is distributed in a manner expressed by Equation 3-1 and the refractive index in the periphery thereof is distributed by performing the step approximation on Equation 3-2. The thickness of each layer is the same as that in the second embodiment.

In the third embodiment, quartz film is stacked using a CVD method, and Ge is added during the film formation in a manner such that each layer has a desired refractive index, so as to produce a gradient-index lens. The relationship between the refractive index and the amount of Ge to be added is discussed in Section 5.3 in Reference [1], for example. Reference [1] is "Handbook for Optical Communication" (in Japanese) edited by Kuniyoshi YANAGII and published by Asakura Shoten in 1982. After the wet etching is performed using photolithography and hydrofluoric acid, each side surface is polished so as to process the shape thereof.

It is confirmed that when the HeNe laser light is irradiated to the gradient-index lens which has been thus produced according to the third embodiment in the similar manner to the first embodiment, the light is focused on the surface 1 also.

As an example of method for manufacturing gradient-index lenses according to the present invention using glass, the refractive index profile can be formed by flame hydrolysis deposition, sputtering, vapor deposition or the like while impurities such as quartz are added with the quartz.

Fourth Embodiment

Figure 12A:
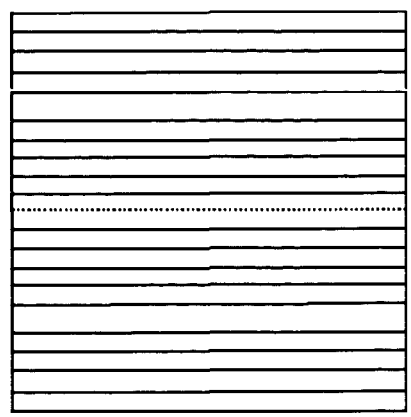
FIGS. 12A and 12B show a structure of gradient-index lens according to a fourth embodiment.
Figure 12B:
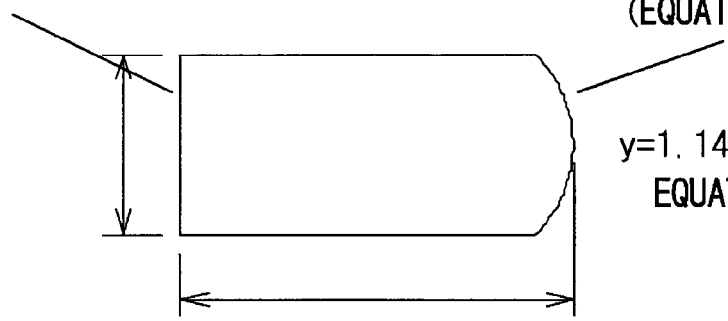
Figure 13:
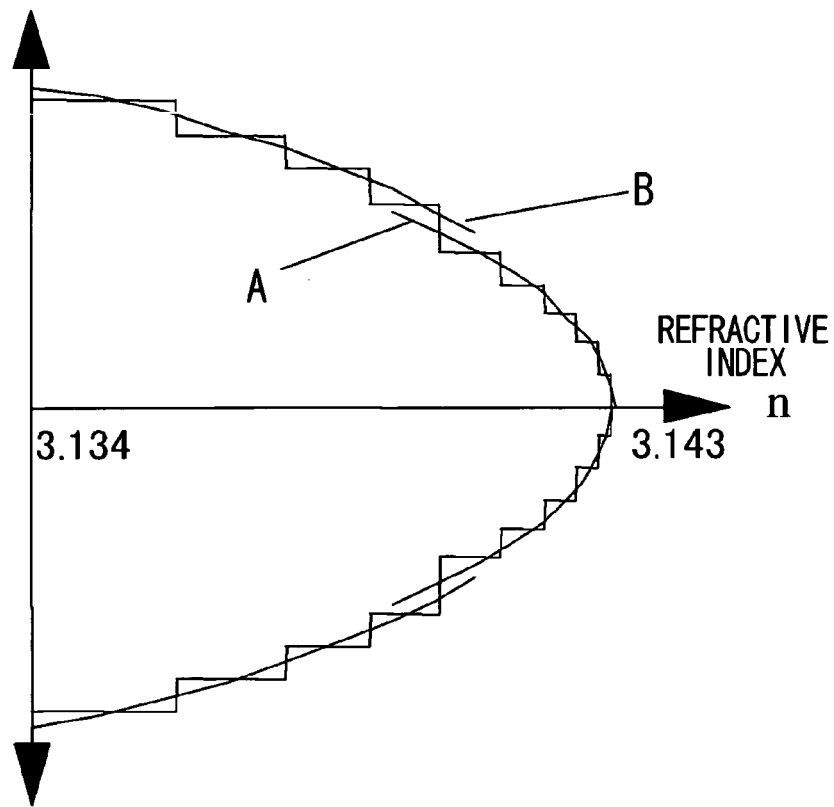
FIG. 13 shows a refractive index profile of a gradient-index lens according to the fourth embodiment.

FIGS. 12A and 12B show a shape of gradient-index lens according to a fourth embodiment. In a top view shown in FIG. 12B, the surface 2 has a form expressed by Equation 4-3, that is, $y=1.14x^2$. The outside dimensions of the lens are the same as those in the first embodiment above, namely, the horizontal length is 2 mm and the vertical length is 1 mm. FIG. 13 illustrates a refractive index profile. In the case of FIG. 13, an element is so designed that the refractive index in the middle part of the element is distributed in a manner expressed by Equation 3-1 and the refractive index in the periphery thereof is distributed by performing the step approximation on Equation 3-2. It is to be noted that the shape of surface 2 is not cylindrical but of curved surface expressed by a quadratic function expressed in Equation 4-3. This curved surface may be of a hyperbolic function.

In this fourth embodiment, a GaAlAs crystal is grown on a GaAs substrate by metal organic chemical vapor deposition (MOCVD) or metal-organic vapor phase expitaxy (MOVPE), and the flow rates of TMGa (Trimethylgallium) and TMAl (Trimethylaluminium) during their growth are varied so as to obtain the refractive index profiles expressed by Equation 4-1 and Equation 4-2, respectively. The relationship between the composition of a crystal and the refractive index is described in Reference [2] and other references, for example. Reference [2] is a book entitled "Semiconductor Laser (A Series of Applied Physics)" (in Japanese) edited by Kenichi IGA and published by Ohmusha in 1994. The processing of a shape is done by photolithography and RIE (Reactive Ion Ethcing) Thus, the processing thereof is easily done even if the shape of surface 2 is not cylindrical.

Since the visible light does not permeate the material in the fourth embodiment, the operation is checked in such a manner that the semiconductor laser with wavelength of 1.3 μm as light source is introduced to a single-mode optical fiber. In this fourth embodiment, too, it was verified that the light was focused on the surface 1.

Though GaAs/GaAlAs type is used as material in the fourth embodiment, other material in III–V group such as InP/InGaAsP type and GaN/InGaN type or the material belonging to II–VI group such as ZnSe/ZnS type may also be used. In particular, the GaN/InGaN type and the ZnSe/ZnS type may be used in a visible wavelength range.

Fifth Embodiment

Figure 14A:
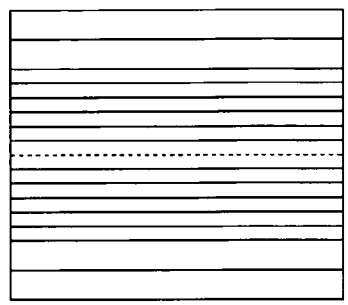
FIGS. 14A and 14B show a structure of a gradient-index lens and a refractive index profile thereof according to a fifth embodiment, respectively.
Figure 14B:
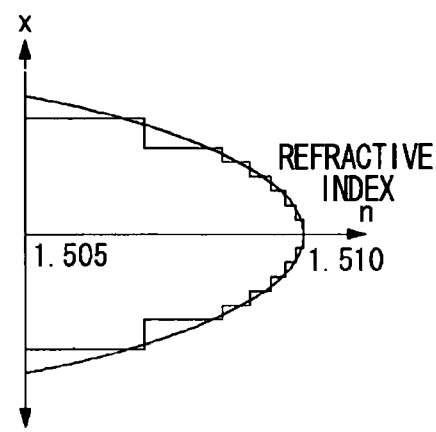

FIG. 14A illustrates the shape and dimensions of a gradient-index lens according to a fifth embodiment, and FIG. 14B illustrates a refractive index profile thereof. An approximate function for refractive index profile according to this fifth embodiment is expressed by the same equation (Equation 1 shown in FIG. 2) as in the first embodiment, and is so designed that a quadratic function, where the maximum is attained in the optical axis, is approximated in a step-wise manner.

The same material as that used in the first embodiment is used in the fifth embodiment. According to the fifth embodiment, in contrast to the first embodiment, the first and the second layer and the fifteenth and the sixteenth layer in the peripheral part are designed to have the thickness of 20 μm, respectively, which is larger compared to the first embodiment. And the thickness of the third layer through the fourteenth layer in the middle part is set to 10 μm each, which is relatively thin. It was also confirmed that, even in the gradient-index lens structured according to the fifth embodiment, the occurrence of the sub-spots is suppressed as in the first embodiment.

Sixth Embodiment

Figure 15A:
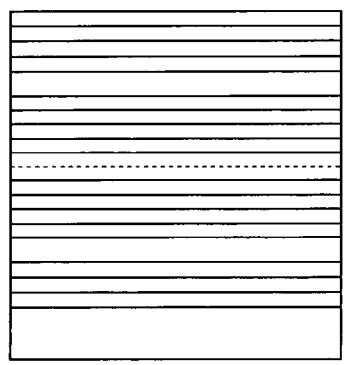
FIGS. 15A and 15B show a structure of a gradient-index lens and a refractive index profile thereof according to a sixth embodiment, respectively.
Figure 15B:
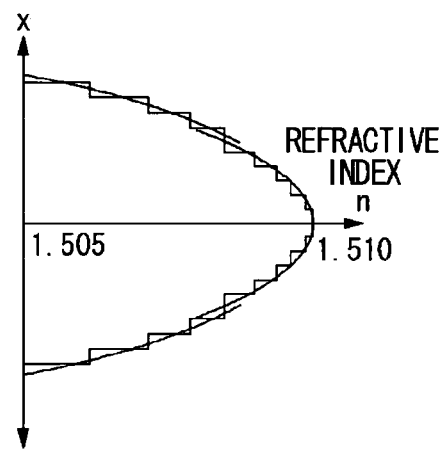

FIG. 15A illustrates the shape and dimensions of a gradient-index lens according to a sixth embodiment, and FIG. 15B illustrates a refractive index profile thereof. The approximate function and the thickness for each layer in the sixth embodiment are basically the same as those in the second embodiment except that either one of the outermost layers (the first layer in FIG. 15A) is designed to have a layer thicker than each of the second layer to the fourth layer in order to be adjusted to have a common optical axis with other optical devices constituting optical systems. Thus, in this sixth embodiment optical axis is deviated from the center of lens in the stacking direction of multilayer film. The same material used as in the first embodiment is used in the sixth embodiment. It was also confirmed that, even in the gradient-index lens so structured according to the sixth embodiment that the layer thickness profile is asymmetrical about the reference optical axis, the occurrence of the sub-spots is suppressed as in the first embodiment.

It is to be noted here that either one of the outermost layers may be made thinner. In such a structure, too, the occurrence of the sub-spots is suppressed as in the first embodiment.

Seventh Embodiment

Figure 16A:
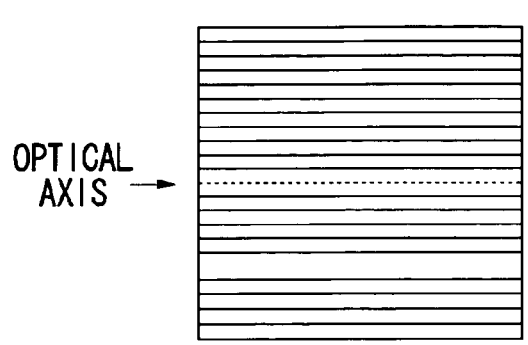
FIGS. 16A and 16B show a structure of a gradient-index lens and a refractive index profile thereof according to a seventh embodiment, respectively.
Figure 16B:
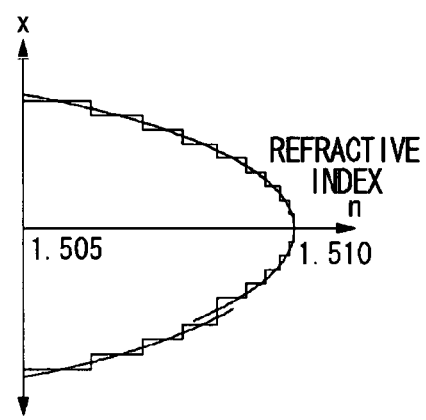

FIG. 16A illustrates the shape and dimensions of a gradient-index lens according to a seventh embodiment, and FIG. 16B illustrates a refractive index profile thereof. According to the seventh embodiment, the thickness of each layer at one side with respect to the optical axis (the upper half in FIG. 16A) is uniformly formed whereas the thickness of each layer at the other side with respect to the optical axis (the lower half in FIG. 16A) is formed in the same manner as in the gradient-index lens and the refractive index profile according to the second embodiment. In this seventh embodiment, sub-spots are caused in the only lower side of a main spot. These sub-spots may be utilized for the use in detecting monitor signals or the like when a fixed base of optical fiber serves as a photodiode, for example. It was also confirmed that, even in the gradient-index lens so structured according to the eighth embodiment that the multilayered films are provided only at one side with respect to the optical axis and the layer thickness profile is formed asymmetrical about the reference optical axis, the occurrence of the sub-spots is suppressed as in the first embodiment.

Eighth Embodiment

Figure 17A:
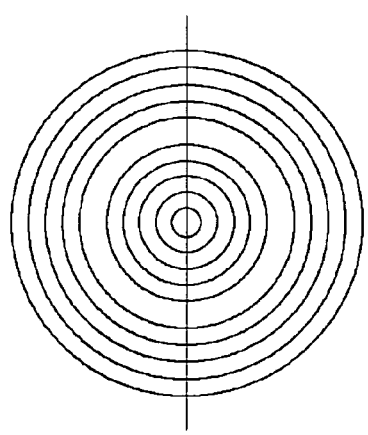
FIGS. 17A and 17B show a structure of a gradient-index lens and a refractive index profile thereof according to an eighth embodiment, respectively.
Figure 17B:
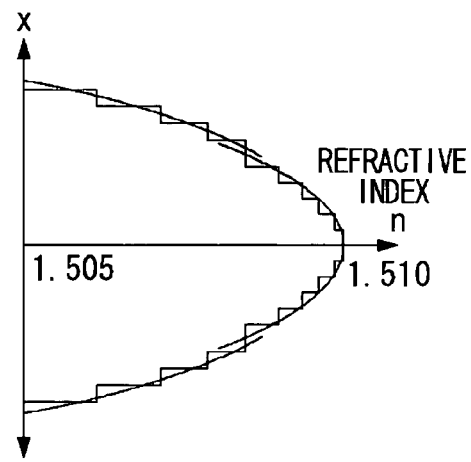

FIG. 17A illustrates the shape and dimensions of a gradient-index lens according to an eighth embodiment, and FIG. 17B illustrates a refractive index profile thereof. Although the refractive index profile in the cross section in the direction perpendicular to the optical is the same as that in the second embodiment, each layer is concentrically stacked with the optical axis being the center. According to the eighth embodiment, the light beams within any plane of any angle passing through the center are converged in accordance with the refractive index profile of a gradient-index lens. Hence, performing the processing or machining on curved surface of the end surface will not be necessary in this eighth embodiment.

Ninth Embodiment

Figure 18:
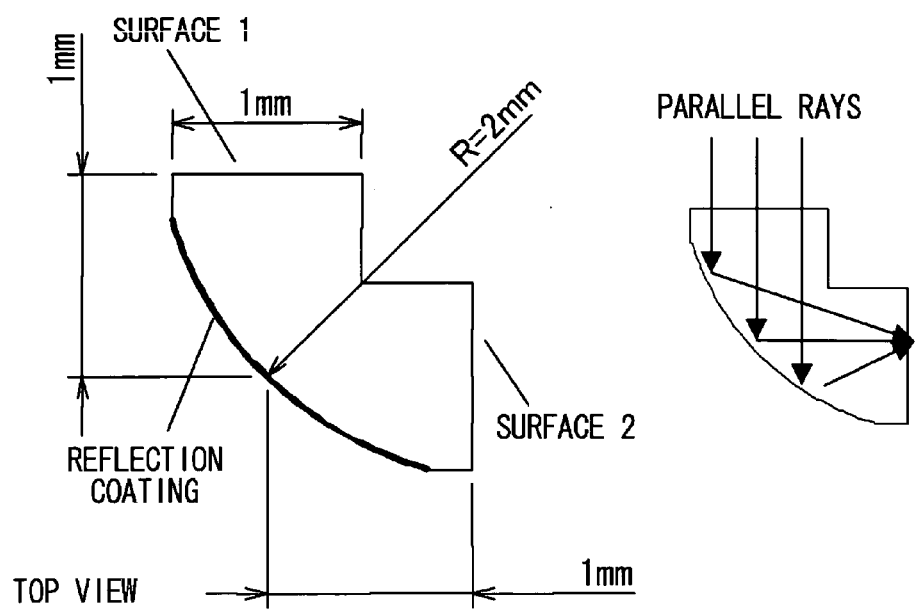
FIG. 18 shows a structure of an optical element according to a ninth embodiment

FIG. 18 shows the shape and dimensions of a gradient-index lens according to a ninth embodiment. The structure thereof in the thickness direction and the refractive index profile thereof are the same as those in the second embodiment, and the description thereof is omitted here. Now, a manufacturing method therefor is described herein. After the processing almost identical to that in the first embodiment is done, a plurality of gradient-index lenses of the same shape according to the present embodiment are stacked on one another. And a metal mask which exposes only a necessary part of reflection coating is placed thereon and then Al is metalized (that is, Al is vacuum-deposited). Alternatively, the reflection coating may be produced, for example, by applying the plating or reflective paint thereto.

In the ninth embodiment, the parallel rays entering from the surface 2 is focused on the surface 1 due to the curved surface on which the reflection coating is provided.

It is to be noted that the surface 1 and surface 2 of gradient-index lens according to the ninth embodiment are both flat surface. Thus, the ninth embodiment is advantageously characterized, for example, by a feature that when a plurality of gradient-index lenses according to the present embodiment are to be connected, they can be integrally structured.

Tenth Embodiment

Figure 19:
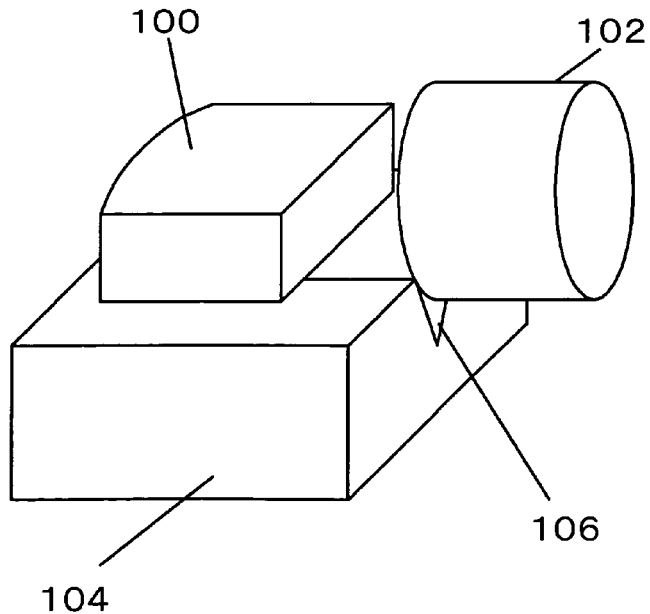
FIG. 19 shows a structure of an optical element according to a tenth embodiment.

FIG. 19 shows a refractive index profile of gradient-index lens according to a tenth embodiment. A gradient-index lens 100 is assembled with an optical fiber 102 so as to provide a function in which outgoing light is outputted as parallel rays. The gradient-index lens 100 is formed on a silicon substrate 104. A guide groove 106 for the optical fiber is formed on the silicon substrate 104 by wet etching, so that the optical fiber is positioned by the guide groove 106 and is fixed by adhesives.

It is to be noted here that the light source where a light emitting element is arranged may be produced instead of an optical fiber, and in such a case the guide groove may not be provided and the substrate may be of a terrace shape, instead. A similar structure may be adopted to the light receiving elements.

Eleventh Embodiment

Figure 20:
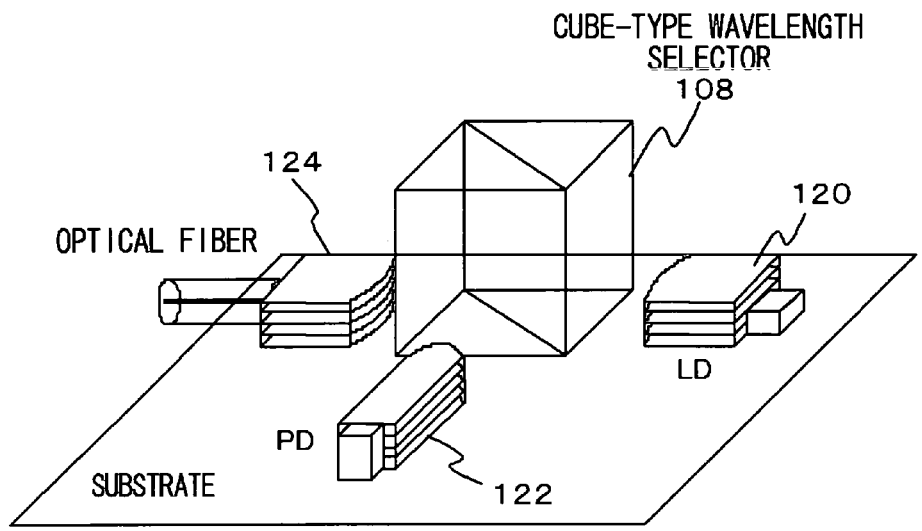
FIG. 20 shows a structure of an optical element according to an eleventh embodiment.
Figure 21:
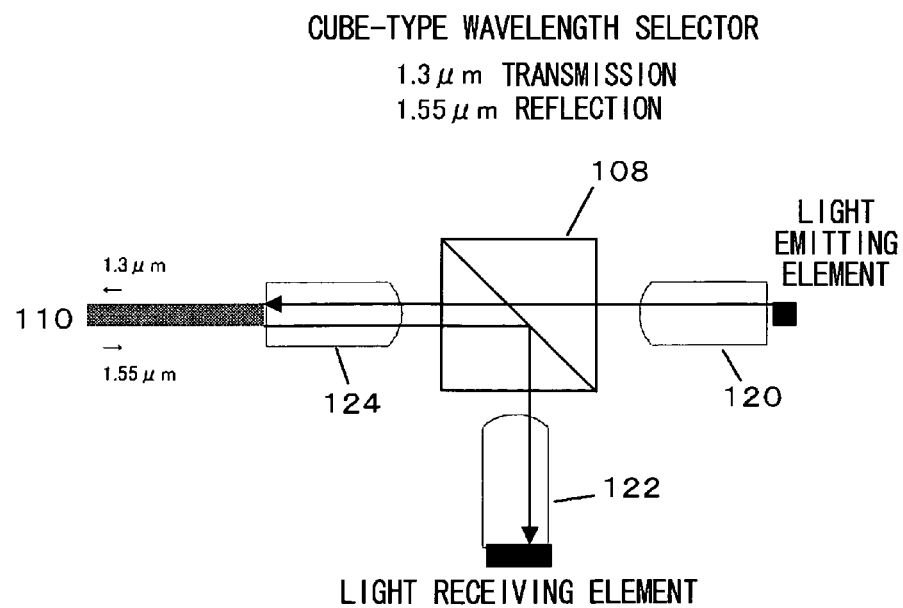
FIG. 21 illustrates an operation for the optical element shown in FIG. 20.

According to an eleventh embodiment, gradient-index lenses 120, 122 and 124 are installed on a light emitting element, a light receiving element and an optical fiber, respectively, and moreover there is provided a device structured such that a cube-type wavelength selector 108 is arranged on a same board as shown in FIG. 20. A semiconductor laser whose oscillation wavelength is 1.3 µm is used as a light emitting element, and used is a wavelength selector so designed that it permeates the light of 1.3 µm band and reflects the light of 1.55 µm band. By implementing the above structure, the same function as the optical transceiver module disclosed in the Japanese Patent Application Laid-Open No. Sho60-184216, where the light transmitted and received is subject to the wavelength multiplexing, can be achieved by a gradient-index lens according to the present invention. FIG. 21 explains this operation. At the time of transmission, optical signals of 1.3 µm emerging from a light emitting element is collimated by the gradient-index lens 120 and the collimated signals permeate the cube-type wavelength 108, and then enters into the optical fiber 110 where the light is focused by the gradient-index lens 124. At the time of reception, the incoming light from the optical fiber 110 is collimated by the gradient-index lens 124 and is reflected by the cube-type wavelength selector 108, and then the reflected light is focused by the gradient-index lens 122 so as to be received by the light receiving element.

Taking into account the heat dissipation of a light emitting element and the electrical wiring in the light emitting element and light receiving element, a member where a metal frame is resin-molded is used as a substrate. On this substrate an organic-inorganic composite is stacked in the similar manner to the first embodiment, and thereafter is stamped in a desired shape by a die. At the time of stamping it, the pressure may be adjusted so that a thin film made of the same material can be left out in the periphery of a lower surface of the gradient-index lens according to the present invention in order to prevent the peeling. Moreover, a grove is simultaneously made in the resin mold of a substrate by using the same die, and this serves as a guide groove for setting up an optical fiber.

A method for producing such a composite optical device will be described hereinbelow. First, in the similar manner to the first embodiment, three gradient-index lenses 120, 122 and 124 are together formed at a time in positions shown in FIG. 20 by using a silicon rubber mold. With these gradient-index lenses as references, the light emitting element, light receiving element, the optical fiber and the cube-type wavelength selector are arranged. If the three gradient-index lenses according to the present invention are so positioned as to be in contact with three sides of the cube-type wavelength selector, possible misregistration which might be caused at the time of setting up filters can be prevented.

Figure 22:
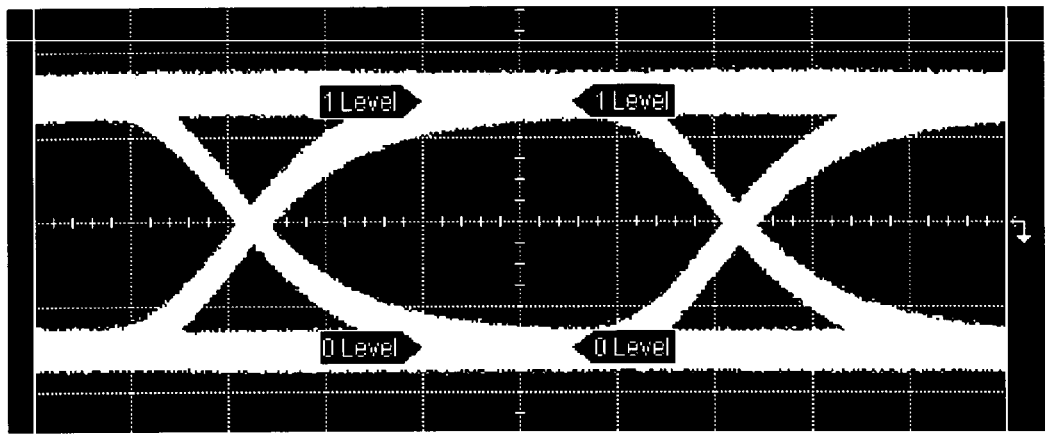
FIG. 22 illustrates eye patterns for an optical transceiver module according to the eleventh embodiment.

When communicated with a commercially available transducer module, using an optical transceiver module according to the present embodiment, where 1.55 µm band is used at transmission and 1.3 µm band at reception, satisfactory transmission waveforms were reproduced at transmission and reception. Eye patterns therefor are shown in FIG. 22.

A cube-type wavelength selector is used in the eleventh embodiment. However, a plate-like wavelength selector may also be used if used is a method in which a guide groove is together formed in a substrate. And if the half-duplex communication suffices, a cube-type or plate-like partial transmission mirror may be used instead of the wavelength selector. The optical fiber may be such that it is detachable from a connector.

Twelfth Embodiment

Figure 23:
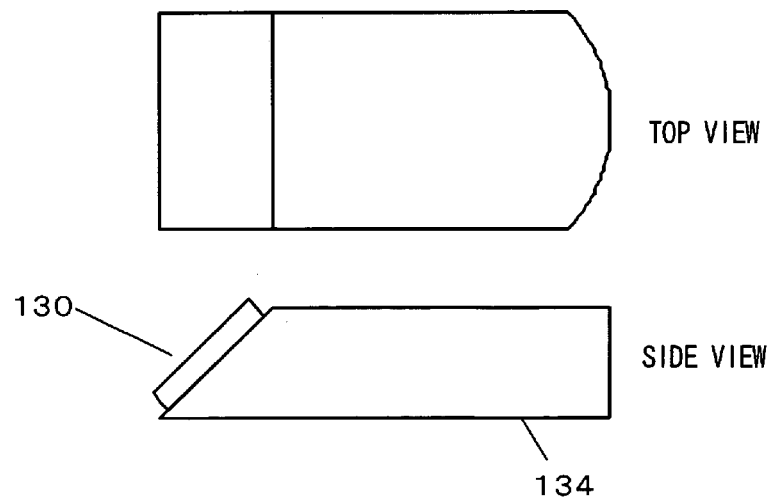
FIG. 23 shows a structure of an element according to a twelfth embodiment.

FIG. 23 shows a structure of an element according to a twelfth embodiment. In this twelfth embodiment, a side surface of a gradient-index lens 134 is angled or tilted as shown in FIG. 23, and a wavelength selector 130 is formed on this side surface. A gradient-index lens 134 which has the same structure as one shown in the second embodiment is used in this twelfth embodiment. The tilted side surface of the gradient-index lens 134 has an angle of 45° and is formed by the dicing using a V-blade. A transparent sheet added with the capability of selecting wavelength is used here as the wavelength selector 130. A light emitting element is set in the gradient-index lens 134 in a tilted manner such that the lower surface thereof is parallel to an optical axis. If the half-duplex communication suffices, a transparent sheet added with a partial transmission capability, instead of the wavelength selecting capability, may be used.

Thirteenth Embodiment

Figure 24:
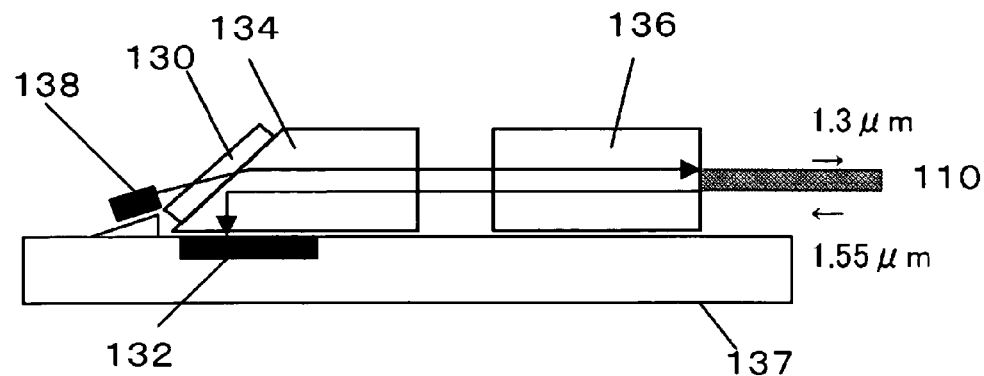
FIG. 24 shows a structure of an optical element according to a thirteenth embodiment.

FIG. 24 shows a structure of an optical transceiver module according to a thirteenth embodiment. This optical transceiver module uses an element according to the twelfth embodiment where the wavelength selecting capability is added.

A light receiving element 132 is embedded in a substrate 137, and a gradient-index lens 134 is formed on this light receiving element 132. The side surface of the gradient-index lens 134 is formed in the same tilted manner as in the twelfth embodiment, and the wavelength selector 130 is provided on this angled side surface. A light emitting element 138 is arranged in a manner such that the optical axis passes through the vicinity of a side surface center of the gradient-index lens 134 via a triangle prism made of material whose refractive index is close to that of the gradient-index lens 134. A gradient-index lens 136 shown in FIG. 24 is the same lens as one described in the first embodiment.

The light emanated from the light emitting element 138 travels in an arrow shown in FIG. 24, and enters an optical fiber through the gradient-index lens 134 and the gradient-index lens 136. The incoming light from the optical fiber, however, travels in an arrow shown in FIG. 24 and enters the light receiving element 132 through the gradient-index lens 136 and the gradient-index 134.

Fourteenth Embodiment

Figure 25:
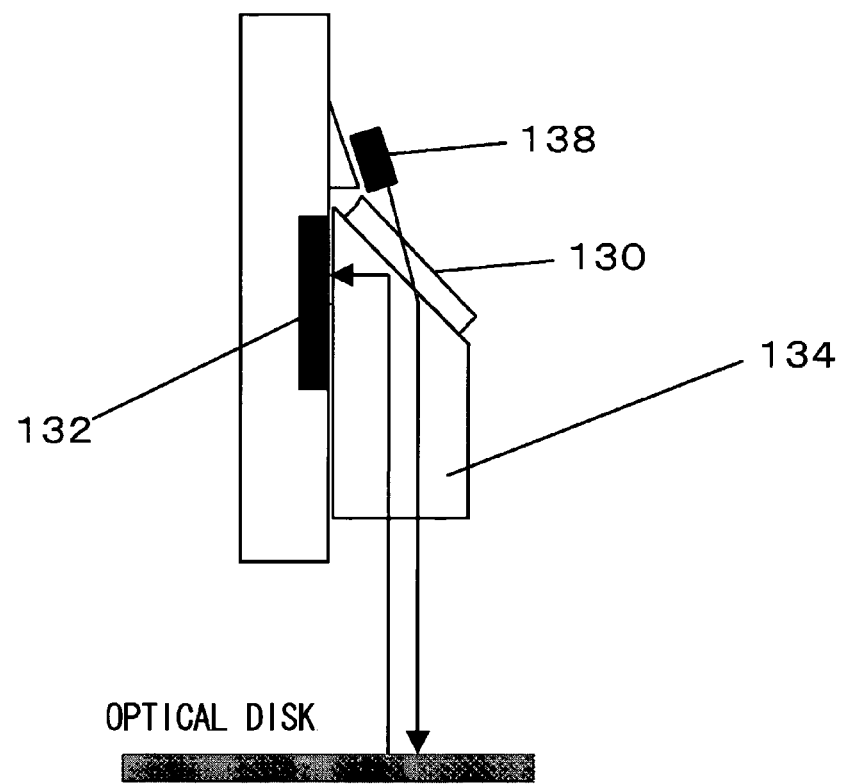
FIG. 25 shows a structure of an optical pickup according to a fourteenth.

FIG. 25 illustrates a fourteenth embodiment showing an optical pickup using a gradient-index lens where a partial transmission mirror, instead of the wavelength selector, is used in the thirteenth embodiment. The description of components labeled with the same reference numerals as in FIG. 24 will be omitted here. Used in this fourteenth embodiment is a gradient-index lens where the aperture thereof and the numerical aperture (NA) thereof are set larger in order to squeeze the focusing spot.

Fifteenth Embodiment

Figure 26:
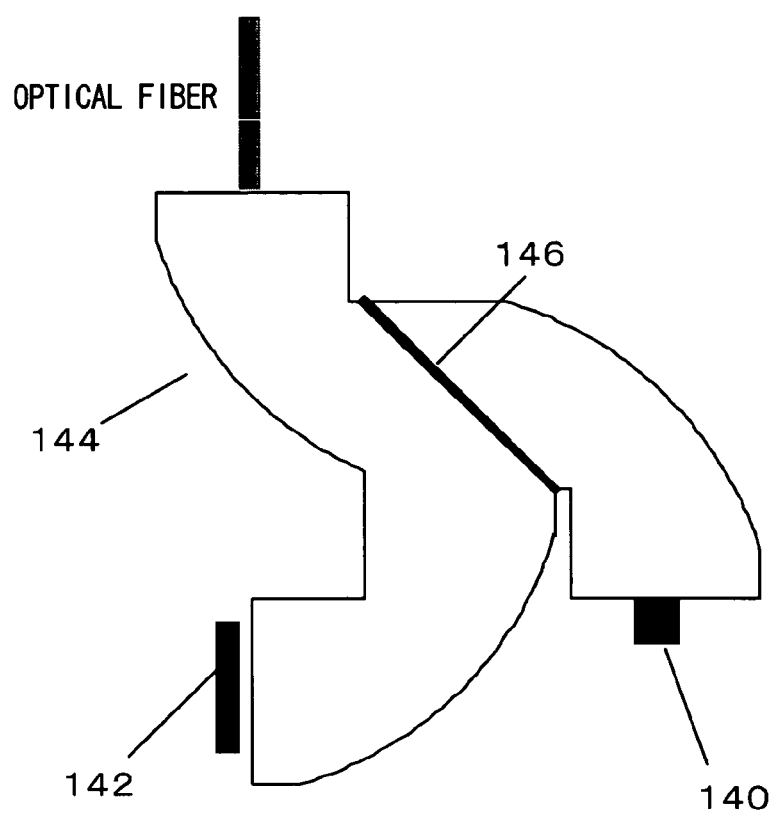
FIG. 26 illustrates a structure of an optical transceiver module according to a fifteenth embodiment.

FIG. 26 illustrates a structure of an optical transceiver module according to a fifteenth embodiment. This module is so structured that a gradient-index lense 144 and a cube-type wavelength selector 146 are integrally combined into a single unit. Here, the gradient-index lens 144 is structured such that three of the gradient-index lens according to the ninth embodiment are integrally combined into a single unit. The cube-type wavelength selector 146 is the one as described in the eleventh embodiment. A light emitting element (having emission wavelength of 1.3 μm) 140 and a light receiving element 142 are bonded to the gradient-index lens 144.

A method for manufacturing the optical transceiver module will be described hereinafter. First, an integrally structured gradient-index lens, according to the present invention, having a continuous refractive index profile in the thickness direction is formed in a silicon rubber mold by following the procedures described in the first and second embodiments. Next, this gradient-index lens is attached to a metal board, and an incision is provided in the board to hold a wavelength selector. This incision is produced by using a heated blade and by means of a mechanical processing. Furthermore, the wavelength selector 146 is inserted in this incision and fixed with adhesives having a refractive index close to the gradient-index lens. Then, the light emitting element is placed in a predetermined position. Thereafter, the position of the optical fiber is adjusted, while illuminating the light emitting element, in a manner such that the output of the optical fiber becomes maximum. After the position of the optical fiber is thus adjusted, the optical fiber is fixed with adhesives. Finally, the light is introduced from the opposite side of the optical fiber. And after the position of the optical fiber is so adjusted that the output thereof becomes maximum while the light is being detected by the light receiving element, the optical fiber is fixed with adhesives.

Sixteenth Embodiment

Figure 27:
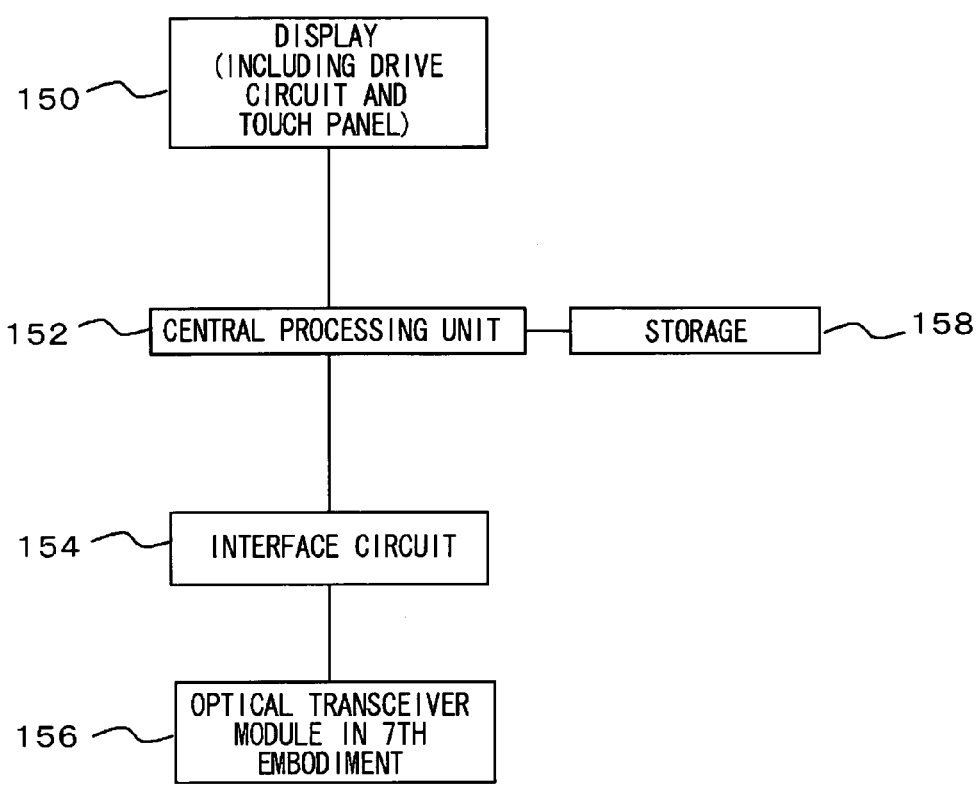
FIG. 27 is a block diagram showing a handheld information terminal, according to a sixteenth embodiment, equipped with an optical transceiver module according to the eleventh embodiment.

FIG. 27 is a block diagram showing a personal digital assistance (PDA) or a handheld information terminal according to a sixteenth embodiment, equipped with an optical transceiver module according to the eleventh embodiment. A display 150, a storage 158 and an interface circuit 154 are connected to a central processing unit 152. The optical transceiver module 156 according to the eleventh embodiment is connected to the central processing unit 152 via the interface circuit 154.

Since the gradient-index lens and the optical circuit according to the present invention can be of an extremely small and low-profile structure, they are particularly convenient and suitable for use with PDAs, portable phones and so forth to be installed therein. Not to mention, they can be used for telecommunication equipment such as media converters, network hubs, optical network units (ONU) and telephone equipment, and information equipment such as personal computers and their peripheral equipment. Moreover, they can be used for the interface for home electric appliances such as television receivers, air-conditioning equipment, refrigerators and so forth.

The present invention has been described based on the embodiments which are only exemplary. It is understood by those skilled in the art that there exist other various modifications to the combination of each component and process described above and that such modifications are encompassed by the scope of the present invention which is defined by the appended claims.

What is claimed is:

1. A gradient-index lens including multilayered film having a refractive index profile in a stacking direction, wherein a multilayered film of at least one side of the lens with respect to an optical axis includes:
- a first area which is constituted by two or more continuous layers which differ in refractive index and are approximately identical in thickness; and
- a second area, thicker than said first area, which is constituted by two or more continuous layers which differ in refractive index and are approximately identical in thickness.

2. A gradient-index lens according to claim 1, wherein between said first area and said second area there is provided at least one layer whose thickness differs from that of any of layers in said first and second areas.

3. A gradient-index lens according to claim 1, wherein said second area is provided exterior to the first area, relative to the optical axis.

4. A gradient-index lens according to claim 1, wherein the distribution of layer thickness is asymmetrical about an optical axis reference.

5. A gradient-index lens according to claim 1, wherein the multilayered film is provided only at one side with respect to the optical axis.

6. A gradient-index lens according to claim 1, wherein the multilayered film are provided at both sides of the optical axis.

7. A gradient-index lens according to claim 1, wherein the optical axis is deviated from the center of lens in the stacking direction.

8. A gradient-index lens according to claim 1, wherein part or whole of a side that intersects with an optical axis of the gradient-index lens is of a convex shape having a curvature in a horizontal plane perpendicular to the stacking direction.

9. A gradient-index lens according to claim 8, wherein focal length, in a plane parallel to the stacking direction and the optical axis is approximately identical to focal length in the horizontal plane.

10. A gradient-index lens according to claim 1, wherein the multilayered film is concentrically stacked.

11. A gradient-index lens according to claim 10, wherein a refractive index profile along the stacking direction of the multilayered film in a cross section of the multilayered film perpendicular to the optical axis is structured in a manner such that a refractive index decreases as the cross section moves away from a center of the cross section.

12. A gradient-index lens according to claim 10, wherein the multilayered film is made of an organic-inorganic composite containing at least one type of metal alkoxide.

13. A gradient-index lens according to claim 1, wherein a refractive index profile along the stacking direction of the multilayered film in a cross section of the multilayered film perpendicular to the optical axis is structured in a manner such that a refractive index decreases as the cross section moves away from a center of the cross section.

14. A gradient-index lens according to claim 13, wherein the refractive index profile is a distribution obtained by step approximation of a hyperbolic function or a quadratic function.

15. A gradient-index lens according to claim 1, wherein the multilayered film is made of an organic-inorganic composite containing at least one type of metal alkoxide.

16. A composite optical element, including:
- a gradient-index lens including multilayered film having a refractive index profile in a stacking direction, wherein a multilayered film of at least one side of the lens with respect to an optical axis includes:
- a first area which is constituted by two or more continuous layers which differ in refractive index and are approximately identical in thickness; and
- a second area, thicker than the first area, which is constituted by two or more continuous layers which differ in refractive index and are approximately identical in thickness; and
- an optical element other than said gradient-index lens.

17. A composite optical element according to claim 16, wherein said optical element other than said gradient-index lens includes at least one of a light emitting element, a light receiving element and a fiber and wherein said gradient-index lens and said optical element are integrally structured.

18. A composite optical element according to claim 17, wherein said gradient-index lens has a side surface which intersects with the optical axis in an angled manner, and wherein at least one of total reflection mirror, a partial transmission mirror and a wavelength selector is provided on the side surface.

19. A composite optical element according to claim 16, wherein said gradient-index lens has a side surface which intersects with the optical axis in a tilted manner, and wherein at least one of a total reflection mirror, a partial transmission mirror and a wavelength selector is provided on the side surface.

20. A composite optical element, including:
- a gradient-index lens including multilayered film having a refractive index profile in a stacking direction, wherein a multilayered film of at least one side of the lens with respect to an optical axis includes:
- a first area which is constituted by two or more continuous layers which differ in refractive index and are approximately identical in thickness; and
- a second area, thicker than the first area, which is constituted by two or more continuous layers which differ in refractive index and are approximately identical in thickness; and
- an optical element other than said gradient-index lens,
wherein the multilayered film is concentrically stacked.

* * * * *